US007134862B2

(12) United States Patent
Schmidt et al.

(10) Patent No.: US 7,134,862 B2
(45) Date of Patent: Nov. 14, 2006

(54) RADIATION-TRANSPARENT DIE HALF FOR A FORMING DIE

(75) Inventors: Joerg-Peter Schmidt, Ichtershausen (DE); Markus Wallberg, Grosspuerschuetz (DE); Wolfgang Seiferth, Jena (DE)

(73) Assignee: Jenoptik Laser, Optik, Systeme GmbH, Jena (DE)

( * ) Notice: Subject to any disclaimer, the term of this patent is extended or adjusted under 35 U.S.C. 154(b) by 0 days.

(21) Appl. No.: 10/826,570

(22) Filed: Apr. 16, 2004

(65) Prior Publication Data

US 2005/0191380 A1 Sep. 1, 2005

(30) Foreign Application Priority Data

Feb. 26, 2004 (DE) ..................... 10 2004 010 648

(51) Int. Cl.
*B29D 11/00* (2006.01)

(52) U.S. Cl. .................................... 425/174.4; 425/808

(58) Field of Classification Search ............. 425/174.4, 425/808; 249/135, 160; 264/1.36
See application file for complete search history.

(56) References Cited

U.S. PATENT DOCUMENTS 4,701,288 A * 10/1987 Cook et al. ................ 264/1.38
4,732,715 A * 3/1988 Bawa et al. ............... 264/1.36
5,782,460 A * 7/1998 Kretzschmar et al. ..... 264/1.36
6,800,225 B1 * 10/2004 Hagmann et al. .......... 264/1.36

FOREIGN PATENT DOCUMENTS

EP 0 637 490 3/1999
WO WO 03/035376 5/2003

* cited by examiner

*Primary Examiner*—Donald Heckenberg
(74) *Attorney, Agent, or Firm*—Reed Smith LLP

(57) ABSTRACT

A radiation-transparent die half for a forming die in which a beam outlet from a shaping beam outlet surface is spatially limited by a diaphragm is manufactured in a simpler and more economical manner. Further, a long life is additionally ensured through the possibility of reworking the forming beam outlet surface in combination with effective protection of the diaphragm. According to the invention, the diaphragm is constructed as a radiation-impermeable layer which is enclosed up to its end faces by radiation-transparent material.

13 Claims, 1 Drawing Sheet

RADIATION-TRANSPARENT DIE HALF FOR A FORMING DIE

CROSS-REFERENCE TO RELATED APPLICATIONS

This application claims priority of German application No. 10 2004 010.648.7, filed Feb. 26, 2004, the complete disclosure of which is hereby incorporated by reference.

BACKGROUND OF THE INVENTION a) Field of the Invention

The invention is directed to a radiation-transparent die half for a forming die in which a beam outlet from a forming beam outlet surface is spatially limited by a diaphragm.

b) Description of the Related Art

There are known forming techniques for the production of contact lenses which lead to a fully formed lens without the need for subsequent machining of surfaces and edges. The forming dies that are used comprise specially shaped female and male die elements, the contact lenses being shaped from a cross-linkable starting material in the open cavity of these die elements.

When the cross-linking is initiated by radiation energy, particularly by irradiation with UV light, it is known from EP 0 637 490 B1 to use UV-transparent material, preferably quartz in particular also because of its hardness and durability through which the irradiation with UV light is carried out with energy applied to one side, e.g., for the male die part.

A diaphragm is used for spatially limiting the initiating radiation on the lens material located in the cavity, so that the edge of the lens is shaped exclusively by spatial beam limiting. For producing the diaphragm, it is suggested that a thin layer of chrome is preferably applied, e.g., to the forming surface of the male die element, by lithographic processes.

A disadvantage consists in the high susceptibility of the thin layer of chrome to mechanical or other environmental influences which destroy the diaphragm function. In EP 0 637 490 B1, contact between the two die halves is prevented during the forming process or a protective coating is provided for the diaphragm in order to protect the forming surface and/or the diaphragm located thereon from mechanical influences as far as possible; however, should damage occur at the thin chrome layer, this damage can not be eliminated and the die must be replaced.

A further disadvantage consists in the technical and financial expenditure required for producing the chrome layer which is a result particularly of the applied lithographic fabrication process. The process is applied primarily to molds which are symmetric with respect to rotation. In the absence of rotational symmetry, e.g., in the case of non-symmetric forming surfaces with respect to rotation, centering of the forming mask is critical or requires unreasonably high expenditure.

Aside from the construction mentioned above, WO 03/035376 A1 discloses another suggestion which provides a relatively costly design for a holder to hold a radiation-transparent die element for the purpose of spatial beam limiting. A separate holder part which encloses the radiation-transparent die element cooperates with another annular diaphragm which is held mechanically in the holder and which has a conically tapering inner diameter.

OBJECT AND SUMMARY OF THE INVENTION

On this basis, it is the primary object of the invention to overcome the problems relating to the above-mentioned diaphragm. A reduction in cost is achieved in particular through simpler and more economical manufacture and through increased life of the components that are used. Working life can be additionally increased by ensuring the ability to rework the forming beam outlet surface in combination with an effective protection of the diaphragm.

According to the invention, this object is met in the radiation-transparent die half of the type mentioned above in that the diaphragm is constructed as a radiation-impermeable layer which is enclosed up to its end faces by radiation-transparent material.

The radiation-transparent die half is preferably constructed in such a way that the radiation-impermeable layer has communicating layer portions, a first layer portion covering a radiation-transparent material area and extending up to the forming beam outlet surface. The inner end face of a second layer portion is placed around the first layer portion as a layer ring.

In a special construction of the invention, the two layer portions are arranged between two die half parts which are connected to one another and which are advantageously made from the same radiation-transparent material, a first die half part being constructed as a hollow cylinder and a second cylindrical die half part being divided into two partial cylinders having different diameters. The hollow cylinder is placed on the partial cylinder with the smaller diameter.

In contrast to the prior art cited in the introductory part, in which the diaphragm is located on the forming surface, the diaphragm contained in the material need not be adapted to an existing surface contour of the forming surface, rather, the surface contour may be manufactured in any desired manner with the existing diaphragm. As a consequence of this precondition, it is also possible to rework the forming surface subsequently without negatively affecting the functioning of the diaphragm or destroying the diaphragm. Since the diaphragm which is integrated in the radiation-permeable material is protected against mechanical stresses, the radiation-impermeable layer need not meet the high strength requirements.

When a metal layer is used for the radiation-impermeable diaphragm, it can serve as a joining layer in the cylindrical layer portion as well as in the annular layer portion or in both layer portions. In addition to the metal layer, an absorbent layer can be provided. In another construction, the radiation-impermeable layer can also be a nonmetallic layer.

In a preferred construction of the invention, the die half is part of a forming die for the production of contact lenses.

The above-stated object is further met, according to the invention, through an optical assembly comprising radiation-transparent material and a diaphragm for spatially limiting a beam outlet from a beam outlet surface in that the diaphragm is constructed as a radiation-impermeable layer in the radiation-transparent material.

The optical assembly is preferably constructed in such a way that the radiation-impermeable layer has layer portions which communicate with one another, a first hollow-cylindrical layer portion enclosing a radiation-transparent area and extending up to the beam outlet surface, and that the inner end face of a second, annular layer portion is placed around the first layer portion. The two layer portions are advantageously arranged perpendicular to one another.

The beam outlet surface of the optical component can be constructed in a particularly advantageous manner as a forming surface for a die half of a forming die.

The invention will be described more fully in the following with reference to the schematic drawings

DESCRIPTION OF THE PREFERRED EMBODIMENTS

Figure 1:
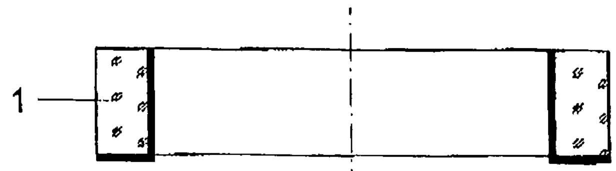
FIG. 1 shows a section through a hollow-cylindrical die half part.
Figure 2:
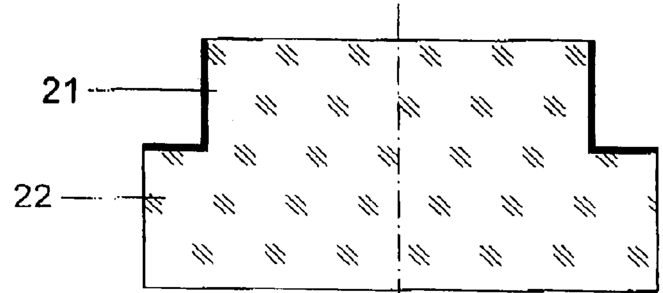
FIG. 2 shows a section through a radiation-transparent cylindrical die half part.
Figure 3:
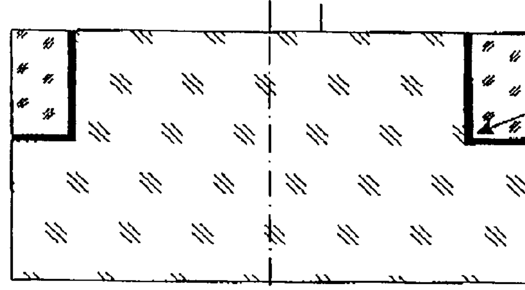
FIG. 3 shows joined parts from FIGS. 1 and 2.

The present invention relates to a radiation-transparent die half of a forming die, particularly a male die half (male die element) which will be described more fully and which is considered as an optical assembly in a very broad sense. The series of FIGS. 1 to 5 illustrates the production process.

The subject matter of the invention comprises a hollow-cylindrical die half part 1 and a radiation-transparent cylindrical die half part 2 which is divided into two partial cylinders 21, 22 with different diameters. The hollow-cylindrical die half part 1 whose outer diameter corresponds to the larger partial cylinder diameter is placed on the partial cylinder 21 with the smaller diameter.

Since the inner diameter of the hollow-cylindrical die half part 1 is manufactured with a slight difference in dimensions with respect to the smaller partial cylinder diameter, a gap remains open between the two die half parts 1, 2 for receiving radiation-impermeable material so that a radiation-impermeable layer 3 is formed inside the die half. This layer 3 is preferably constructed in such a way that the cylindrical die half part 2 in the area of the partial cylinder 21 with the smaller diameter is covered by a first radiation-impermeable cylindrical layer portion 31 which extends to the outside front surface 4 of the die half serving as beam outlet surface. A second radiation-impermeable annular layer portion 32 which is placed with its inner end face around the first layer portion 31 and is connected to the latter is located between the oppositely located surfaces of the two die half parts 1, 2. The two layer portions 31, 32 are preferably at an angle of 90° relative to one another and, according to the invention, form a diaphragm which is covered by material up to its end faces 33, 34 in that the layer 3 is situated between the hollow-cylindrical die half part 1 and the cylindrical die half part 2.

Figure 4:
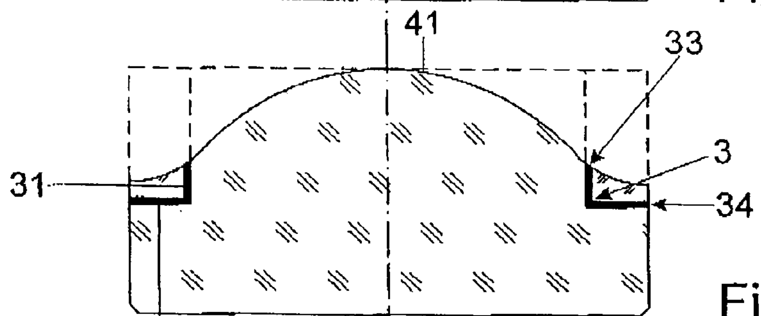
FIG. 4 shows the joined parts with a machined forming surface.

A front beam outlet surface 4, up to which the radiation-impermeable first layer portion 31 extends, serves as a forming surface 41 which can be given the desired shape by suitable machining (FIG. 4). This can be carried out in the course of producing the die half or in subsequent machining of the forming surface 41. In either case, this takes place in the presence of the diaphragm without the functioning of the diaphragm being impaired by the machining.

Figure 5:
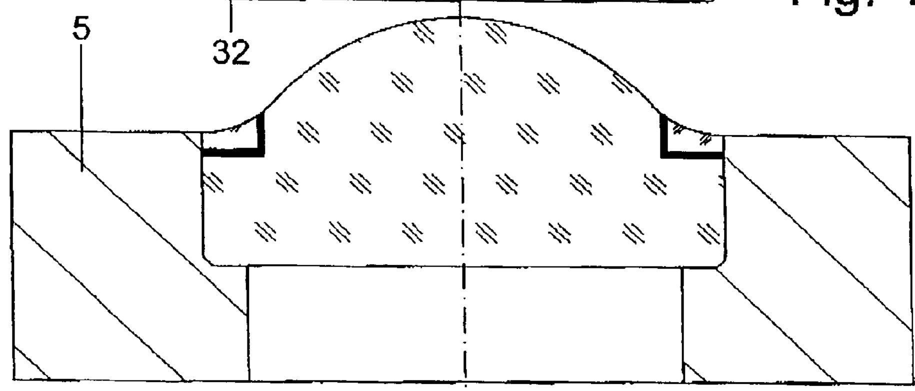
FIG. 5 shows a die half in a holder.

Finally, according to FIG. 5, a holder 5 is provided which encloses the hollow-cylindrical die half part and the cylindrical die half part 1, 2, respectively.

The two die half parts 1, 2 are preferably made from the same radiation-transparent material. This has the advantage that it prevents thermal stresses which can occur in different materials. In particular, this advantage has a positive effect on the forming surface 41 which may not be allowed to lose its shape characteristics. On the other hand, a more effective production process is made possible because no materials of different hardness need to be machined.

In a particularly advantageous embodiment form, the radiation-impermeable material is a metal layer which blocks a beam passing through the die half. In order to prevent gloss effects, a layer of absorbent material such as black chrome can be added to the metal layer. The blocking metal layer preferably serves as a joining layer in the area between the surfaces of the two die half parts 1, 2 facing one another. A firm connection of the two surfaces can be produced, e.g., by means of soldering, gluing or other joining processes familiar to the person skilled in the art.

In contrast, the cylindrical outer surfaces of the two die half parts 1, 2 adjoining one another do not serve as joining surfaces in the present embodiment example. However, this does not prevent these surfaces from being fixedly connected to one another by means of suitable joining processes. However, at least one of the two cylindrical surfaces as well as at least one of the front surfaces is provided with a radiation-blocking, e.g., sputtered, metal coating and can additionally have an absorbent layer which prevents the occurrence of a scattering corona at the forming surface 41. The radiation-impermeable material layer provided in the area of the cylindrical outer surfaces functions exclusively as a diaphragm in the present embodiment form.

When an empty gap space occurs between the cylindrical outer surfaces due to causes relating to manufacture, it can be filled in a suitable manner (e.g., by letting in molten metal) to produce a uniform contour at the forming surface 41. However, in so doing, the diaphragm function must not be impaired.

In another construction, the absorbent layer can also be present exclusively. In that case, the two surfaces to be joined are preferably glued together.

Finally, nonmetallic layers are suitable for the diaphragm.

While the foregoing description and drawings represent the present invention, it will be obvious to those skilled in the art that various changes may be made therein without departing from the true spirit and scope of the present invention.

What is claimed is:

1. A radiation-transparent die half for a forming die comprising:

a beam outlet from a shaping beam outlet surface being spatially limited by a diaphragm;

said diaphragm being constructed as a radiation-impermeable layer which is enclosed up to its end faces by radiation-transparent material wherein the radiation-impermeable layer has layer portions which communicate with one another, a first layer portion covering a radiation-transparent material area and extending up to the shaping beam outlet surface, and wherein the inner end face of a second layer portion is placed around the first layer portion as layer ring.

2. The radiation-transparent die half according to claim 1, wherein the two layer portions are arranged between two die half parts which are connected to one another and which are made of radiation-transparent material, a first die half part being constructed as a hollow cylinder and second cylindrical die half part being divided into two partial cylinders with different diameters, and wherein the hollow cylinder is placed on the partial cylinder with a smaller diameter.

3. The radiation-transparent die half according to claim 2, wherein the material of the die half parts is identical radiation-transparent material.

4. The radiation-transparent die half according to claim 3, wherein the radiation-impermeable layer contains a metal layer.

5. The radiation-transparent die half according to claim 4, wherein at least one of the layer portions serves as a joining layer between the two die half parts.

6. The radiation-transparent die half according to claim 4, wherein an additional radiation-absorbing layer is added to the metal layer.

7. The radiation-transparent die half according to claim 3, wherein the radiation-impermeable layer comprises a radiation-absorbing material.

8. The radiation-transparent die half according to claim 3, wherein the radiation-impermeable layer is a nonmetallic layer.

9. The radiation-transparent die half according to claim 1, wherein the die half is part of a forming die for the production of contact lenses.

10. An optical assembly comprising:

radiation-transparent material and a diaphragm for spatially limiting a beam outlet from a beam outlet surface;

said diaphragm being formed as a radiation-impermeable layer in the radiation-transparent material wherein the radiation-impermeable layer has layer portions which communicate with one another, a first hollow-cylindrical layer portion enclosing a radiation-transparent area and extending up to the beam outlet surface, and wherein the inner end face of a second, annular layer portion is placed around the first layer portion.

11. The optical assembly according to claim 10, wherein the two layer portions are arranged perpendicular to one another.

12. The optical assembly according to claim 11, wherein the material in which the radiation-impermeable layer is formed is identical radiation-transparent material.

13. The optical assembly according to claim 10, wherein the beam outlet surface is constructed as a forming surface for a die half of a forming die.

* * * * *